United States Patent [19]

Ibar

[11] Patent Number: 5,271,876
[45] Date of Patent: Dec. 21, 1993

[54] PROCESS FOR ANALYZING, MONITORING AND/OR CONTROLLING THE INTERNAL STRUCTURE OF NON-CONDUCTIVE, MOLDABLE MATERIAL BY INDUCING AN ELECTRICAL EFFECT THEREIN BEFORE IT IS MOLDED

[75] Inventor: Jean-Pierre Ibar, New Canaan, Conn.

[73] Assignee: Solomat Partners, L.P., Stamford, Conn.

[21] Appl. No.: 903,062

[22] Filed: Jun. 22, 1992

Related U.S. Application Data

[63] Continuation-in-part of Ser. No. 663,988, Feb. 4, 1991, abandoned, which is a continuation-in-part of Ser. No. 245,413, Sep. 21, 1988, abandoned.

[30] Foreign Application Priority Data

Dec. 2, 1986 [FR] France ................... 8616836

[51] Int. Cl.⁵ .............. B29C 47/92; B29C 45/76
[52] U.S. Cl. .......................... 264/22; 264/24; 264/40.1; 264/40.2; 264/40.6; 264/108; 264/540; 264/294; 425/135; 425/143; 425/174.8 E
[58] Field of Search ............... 264/22, 24, 40.1, 104, 264/40.2, 108, 540, 209.6, 236, 347, 40.6, 294; 425/174, 174.2, 174.6, 174.8 R, 174.8 E, 135, 143, 145; 426/129

[56] References Cited

U.S. PATENT DOCUMENTS

| | | |
|---|---|---|
| 3,082,323 | 3/1963 | Chope et al. .............. 425/135 |
| 3,182,103 | 5/1965 | Blaylock, Jr. et al. . |
| 3,194,668 | 7/1965 | Schlelin et al. . |
| 3,306,835 | 2/1967 | Magnus .................. 425/174 |
| 3,644,605 | 2/1972 | Sessler et al. . |
| 4,248,080 | 2/1981 | West . |
| 4,308,370 | 12/1981 | Fukada et al. . |
| 4,378,322 | 5/1983 | Atterbury et al. . |
| 4,427,609 | 1/1984 | Broussoux et al. . |
| 4,469,649 | 9/1984 | Ibar . |
| 4,486,365 | 12/1984 | Klienmann et al. . |
| 4,508,668 | 4/1985 | Broussoux et al. . |
| 4,560,737 | 12/1985 | Yamamoto et al. . |
| 4,591,465 | 5/1986 | Miyata et al. . |
| 4,800,048 | 1/1989 | Bloomfield et al. . |
| 4,808,352 | 2/1989 | Bhateja . |

FOREIGN PATENT DOCUMENTS

| | | |
|---|---|---|
| 0199236 | 10/1986 | European Pat. Off. . |
| 1154211 | 4/1958 | France . |
| 2342838 | 11/1977 | France ................... 264/40.2 |
| 2474942 | 8/1981 | France . |
| 2489739 | 3/1982 | France . |
| 1191624 | 5/1970 | United Kingdom . |

*Primary Examiner*—Jeffery Thurlow
*Attorney, Agent, or Firm*—Seidel, Gonda, Lavorgna & Monaco

[57] ABSTRACT

A process is provided for electrically treating a non-conductive, moldable material by inducing therein a desired electrical effect before it is molded into a desired shape. The process includes pressing, injecting or extruding a material to form a tube, film, rod or the like. The material is then electrically treating the material to induce therein a desired electrical effect. Thereafter, the at least some of the induced electrical effect within the material is permitted to relax. A detectable electrical current is generated by this relaxation. The electrical current is the analyzed and/or monitored. When practicing this invention, the creation of an induced electrical effect, relaxation thereof and analysis of the electrical current generated thereby are performed after or while the material has been, or is being, pressed, injected or extruded, but before the material is molded into its desired shape.

25 Claims, 5 Drawing Sheets

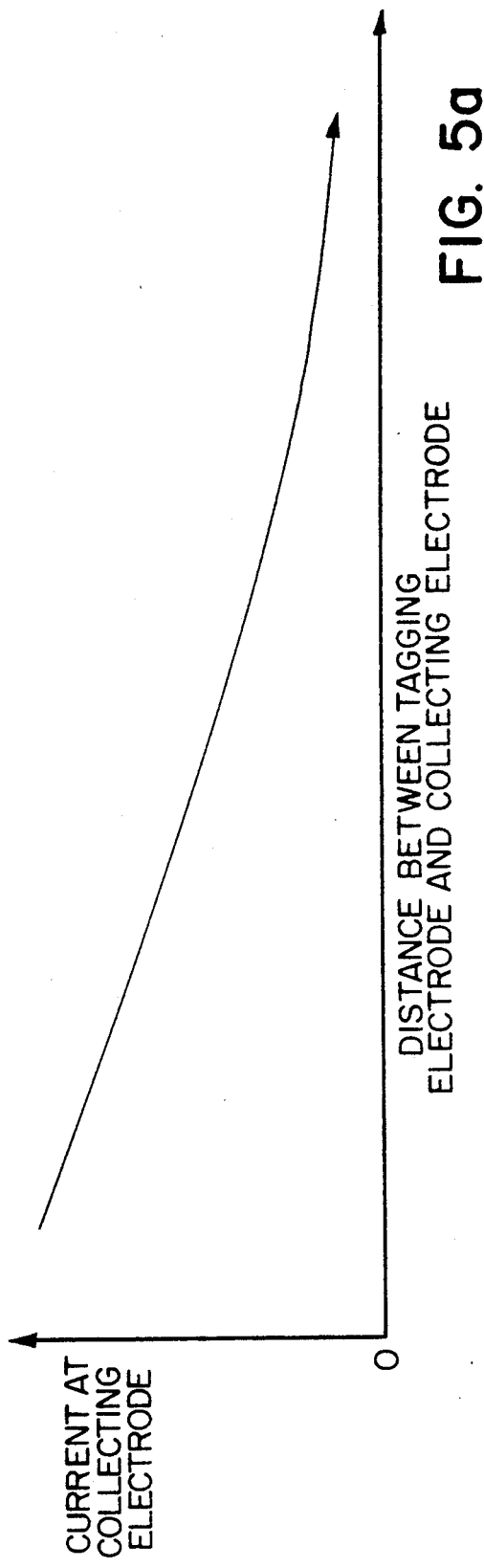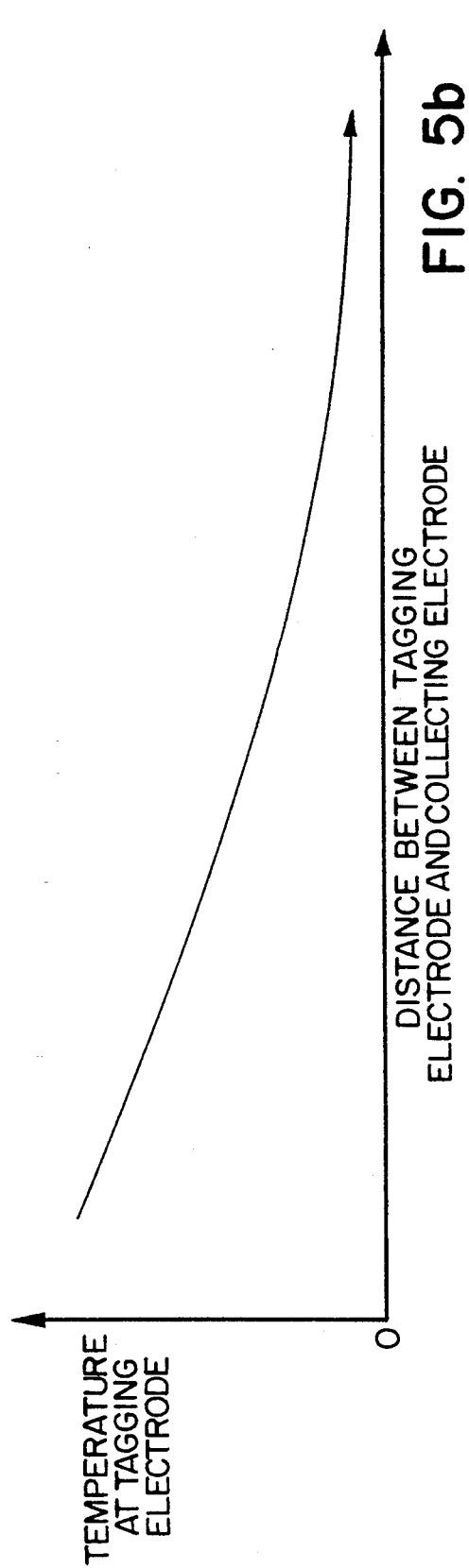

PROCESS FOR ANALYZING, MONITORING AND/OR CONTROLLING THE INTERNAL STRUCTURE OF NON-CONDUCTIVE, MOLDABLE MATERIAL BY INDUCING AN ELECTRICAL EFFECT THEREIN BEFORE IT IS MOLDED

CROSS REFERENCE INFORMATION

This application is a continuation-in-part of U.S. application Ser. No. 663,988, filed Mar. 4, 1991 and entitled "Process for Preconditioning a Plastic Material by Polarization before it is Molded", now abandoned, which is itself a continuation-in-part of U.S. application Ser. No. 245,413, filed Sep. 21, 1988, now abandoned.

FIELD OF THE INVENTION

This invention pertains to a process for analyzing, monitoring and/or controlling the internal structure of a non-conductive, moldable material by inducing an electrical effect therein before it is molded into its desired shape. Particularly, the induction and analysis operations are performed after or while the material is pressed, injected or extruded, but before the material is molded into its desired shape.

BACKGROUND OF THE INVENTION

It is known, in theory, that certain properties of certain non-conductive materials (e.g., plastics) can be advantageously modified by subjecting the same to an electrical field to induce therein a desired electrical effect. On an industrial scale, however, such conventional techniques can only be carried out effectively on relatively small articles. In view of the above, a process which enables the industrial scale application of such techniques would be a welcomed improvement to the conversion industry.

In some circumstances, it is desirable to "tag" or ultimately characterize a non-conductive, moldable material for the purpose of analyzing, monitoring and/or controlling its post thermal mechanical history. This is known in the industry as inducing a "thermal electret", or as producing a "thermally induced electret", within the material. If a means can be devised for easily "tagging" a material, while it is being processed on an industrial scale, and for monitoring and evaluating these "tags", it would be another greatly welcomed improvement.

When a non-conductive, moldable material is being processed (i.e., during pre-molding operations), its internal morphology is generally effected by the processing conditions to which it is subjected. Since such a material's internal morphology has a direct effect on its resulting physical properties, a process which enables one to analyze, monitor and/or control the internal structure of such a non-conductive, moldable material, before it is molded, would be yet another greatly welcomed improvement.

SUMMARY OF THE INVENTION

One object of the present invention is to provide a process which permits the induction of a desired electrical effect in a non-conductive, moldable material before the material has been molded into its desired shape, but after the material has been, or while the material is being, pressed, injected or extruded.

Another object of the present invention is to create a "tagging effect" in a non-conductive, moldable material which will be subjected to a downstream molding process. Such a tagging effect would be designed in a manner such that it can be analyzed, monitored and/or used for controlling procedures in pre-molding, molding, and/or post molding processes.

Yet another object of the present invention is to provide a process for analyzing, monitoring and/or controlling the internal structure of a non-conductive, moldable material. This analyzing, monitoring and/or controlling process is performed before the material has been molded into its desired shape, but after the material has been or while it is being, pressed, injected or extruded.

These and other objects are met by the present invention by the advent of a novel process for treating a non-conductive, moldable material. This process is performed before the material has been molded into its desired shape, but after the material has been, or while it is being, pressed, injected or extruded.

The novel process of the present invention comprises the following steps:

(a) pressing, injecting or extruding a non-conductive, moldable material which either has dipoles or other electrically-charged particles therein, or which is capable of having dipoles or other electrically-charged particles formed therein when subjected to an electrical field;

(b) adjusting the temperature of the pressed, injected or extruded material until it is at a temperature of polarization ($T_p$) which is at least about one half of the material's glass transition temperature ($T_g$) for amorphous type materials when $T_g$ is given in degrees Kelvin, or at least about one half of the material's melting temperature ($T_m$) for crystalline or semi-crystalline materials when $T_m$ is given in degrees Kelvin;

(c) electrically treating the temperature-adjusted material by subjecting the same to a non time-varying, electrical field either until at least some of the dipoles of or other charges within the material are oriented in the direction of the electrical field and/or until dipoles or other electrically-charged particles are created thereby;

(d) permitting at least partial relaxation of the electrically treated material, wherein the relaxation results in the disorientation of and/or decrease in at least some of the dipoles of, or other charges within, said material which were oriented and/or created during the electrical treatment step, and wherein the disorientation generates an electrical current;

(e) measuring the electrical current generated from the relaxation of the electrically treated material;

(f) correlating a relationship between the measured electrical current and the internal physical state of the material;

(g) cooling the relaxed, electrically treated material to a temperature which is at least about 20% below the material's melting temperature ($T_m$) expressed in degrees Kelvin; and (h) molding the cooled material to a desired shape.

Other objects, aspects and advantageous of the present invention will become more apparent to those skilled in the art upon reading the following detailed description, when considered in conjunction with the appended claims.

BRIEF DESCRIPTION OF THE DRAWINGS

A more complete appreciation of the invention will be readily obtained as the same becomes better understood by reference to the following detailed description and the accompanying figures briefly described below.

FIG. 5a and 5b are graphs which plot the effects of temperature and current when a material is subjected to a process encompassed by the present invention.

DETAILED DESCRIPTION OF THE INVENTION

Figure 1:
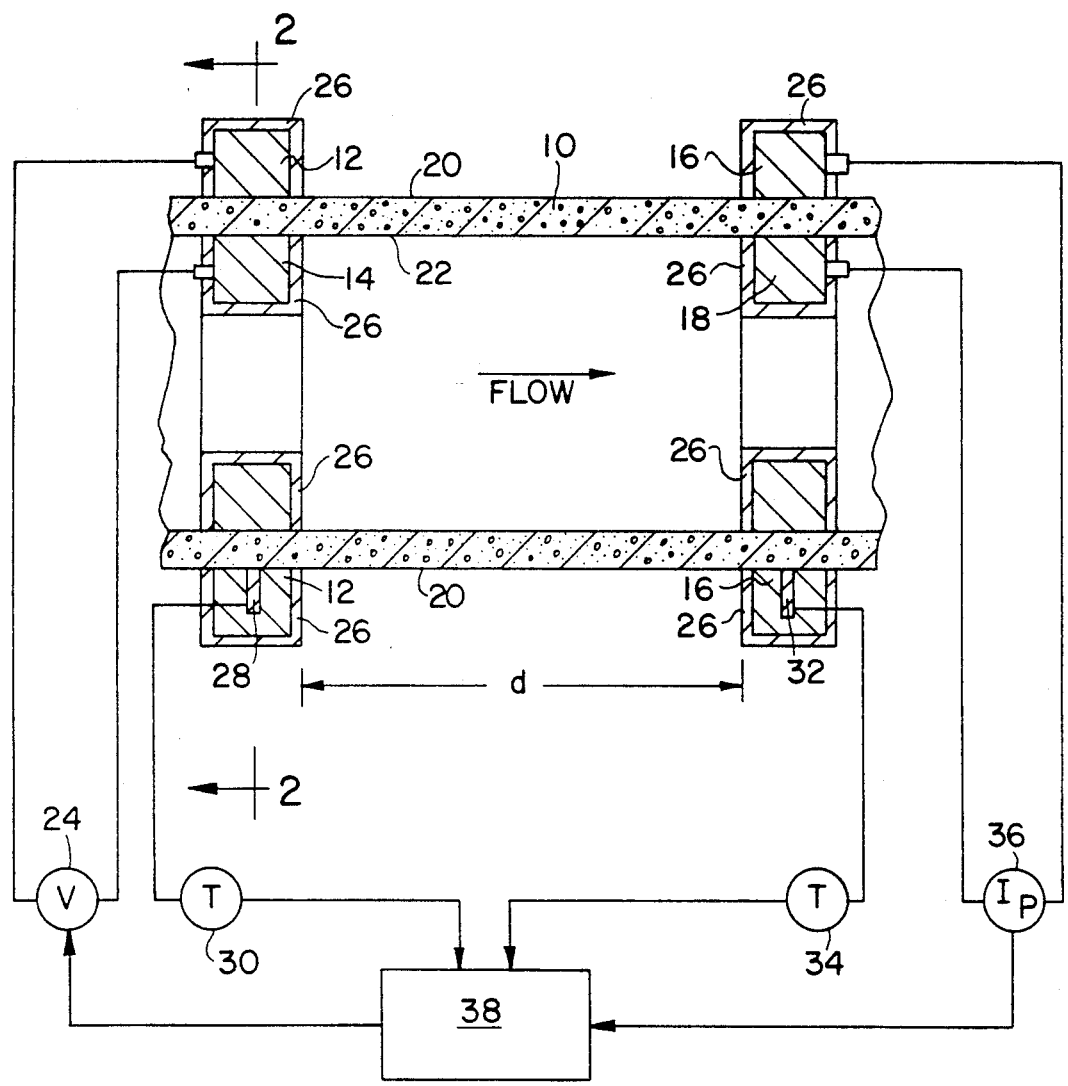
FIG. 1 is a cross-sectional view of a portion of an extrusion process wherein the material being extruded is electronically treated ("tagged") and wherein the electrical current generated from the relaxation of the electrically-treated material is measured ("collected").

The present invention resolves many of the problems which are facing the conversion industry pertaining to the molding of non-conductive, moldable materials (e.g., plastics). For example, by practicing the present invention, those in the plastics conversion industry can now easily create a "tagging effect" in a plastic material. This tagging effect can then be employed to influence either pre-molding, molding, and/or post molding operations.

The objectives of the present invention can be satisfied by performing a process comprising at least the following steps:

(a) inducing a desired electrical effect in a non-conductive, moldable material either by,
  (i) polarizing at least some of the dipoles of or other charges in the material, and/or
  (ii) by creating dipoles or other charges in the material;

(b) permitting the relaxation and/or decrease of at least some of this induced electrical effect such that a detectable electrical current is generated thereby; and (c) analyzing the electrical current generated by the relaxation and/or decrease of such dipoles or charges. It is important to note that, when practicing this invention, the aforementioned creation of an induced electrical effect, relaxation thereof and analysis of the electrical current generated thereby are all preformed before it has been molded into its desired shape, but after the material has been, or while it is being, pressed, injected or extruded.

Specifically, the novel process of the present invention comprises the following steps:

(a) pressing, injecting or extruding a non-conductive, moldable material which either has dipoles or other electrically-charged particles therein, or which is susceptible to the creation of dipoles or other electrically-charged particles when subjected to an electrical field;

(b) adjusting the temperature of the pressed, injected or extruded material until it is at a temperature of polarization ($T_p$) which is at least about one half of the material's glass transition temperature ($T_g$) for amorphous type materials when $T_g$ is given in degrees Kelvin, or at least about one half of the material's melting temperature ($T_m$) for crystalline or semi-crystalline materials when $T_m$ is given in degrees Kelvin;

(c) electrically treating the temperature-adjusted material by subjecting the same to a non time-varying, electrical field either until at least some of the dipoles of, or other charges within, the material are oriented in the direction of the electrical field and/or until dipoles or other electrically-charged particles are created thereby;

(d) permitting at least partial relaxation of the electrically treated material, wherein the relaxation results in the disorientation of and/or decrease in at least some of the dipoles of or other charges within said material which were oriented during said electrical treatment step, and wherein the disorientation of and/or the decrease in the charges generates an electrical current;

(e) measuring the electrical current generated from the relaxation of the electrically treated material;

(f) correlating a relationship between the measured electrical current and the internal physical state of the material;

(g) cooling the relaxed, electrically treated material to a temperature which is at least about 20% below the material's melting temperature ($T_m$) expressed in degrees Kelvin; and (h) molding the cooled material to a desired shape. The manner in which the process of the present invention achieves the aforementioned objectives, and a more detailed description of the process's parameters of operation, will now be discussed.

When practicing the present invention, it is first necessary to start with a non-conductive, moldable material either which has dipoles or other electrically-charged particles therein, or which is susceptible to the creation of dipoles or other electrically-charged particles when subjected to an electrical field. As used herein, the phrase "non-conductive, moldable material" includes those materials which have at least some capacitative properties. In other words, "non-conductive, moldable materials" would exclude those materials which cannot be subjected to the orientation of their internal dipoles or cannot have electrically-charged ionic or free space charges created therein (e.g., "conductors").

Examples of materials which can be classified as "non-conductive, moldable materials" in accordance with the present invention include, without limitation, plastic materials, polymeric materials, rubbery materials, filled or unfilled composite materials, and the like, and/or blends thereof. Moreover, examples of such materials which can easily be subjected to the process disclosed herein include, without limitation, thermoplastics, thermosets, composites, wood in a pasty form, and the like, and/or blends thereof. Specific examples of such materials which can be subjected to the process disclosed herein include, without limitation, polyethylene, polypropylene, nylons, PET, polystyrene, PMMA, polycarbonates, and the like, and/or blends thereof.

After the appropriate starting material has been made or selected, it is pressed, injected or extruded. Generally, during this process step, the material is made to take the shape of a tube, film, rod or the like.

Any suitable pressing, injecting or extruding technique(s) known to those skilled in the art can be employed. The shape in which the material is pressed, injected or extruded depends, in part, on the desired downstream process(es) to which it will be subjected.

After the material has been pressed, injected or extruded, it is subjected to a temperature-adjusting process. Here, the material's temperature is adjusted such that it is at a temperature at which: (a) the dipole or other electrically-charged particles therein can be oriented in the direction of an electrical field, or (b) dipole or other electrically-charged particles can be formed therein when the material is subjected to an electrical field. For the purposes of this invention, a temperature at which this orientation and/or creation of dipoles and/or other electrically-charged particles is referred to as "polarization temperature" or "temperature of polarization" ($T_p$).

A material's temperature of polarization ($T_p$) differs depending upon whether the material has amorphous or crystalline properties. For example, for an amorphous type material, a polarization temperature ($T_p$) would be one which is at least about one half of its glass transition temperature ($T_g$), when $T_g$ is given in degrees Kelvin. However, for a crystalline or semi-crystalline type material, a polarization temperature ($T_p$) would be one which is at least about one half of its melting temperature ($T_m$), when $T_m$ is given in degrees Kelvin.

Typically, when performing the temperature-adjusting step on an amorphous type material, the temperature of the pressed, injected or extruded material is adjusted until it is between about 0.5 $T_g$ and about 1.35 $T_g$ of that material. Preferably, the temperature is adjusted until it is between about 0.75 $T_g$ and about 1.25 $T_g$ of that material. Each of these glass transition temperatures ($T_g$) are those when $T_g$ is given in degrees Kelvin.

On the other hand, when performing the temperature-adjusting step on a crystalline or semi-crystalline type material, the temperature of the pressed, injected or extruded material is adjusted until it is between about 0.5 $T_m$ but below that material's melting temperature. Preferably, the temperature is adjusted until it is between about 0.6 $T_m$ and about 0.9 $T_m$ of that material. Each of the melting temperatures ($T_m$) set out above are those when $T_m$ is given in degrees Kelvin.

After the pressed, injected or extruded material has been subjected to the temperature-adjusting step, the material is electrically treated. This electrical treatment comprises subjecting the temperature-adjusted material to a non time-varying electrical field (e.g., a non-variable voltage).

If the starting material has dipoles or other electrically-charged particles therein, the electrical treatment is applied until at least some of the dipoles of or other charges within the material are oriented in the direction of the electrical field. On the other hand, if the starting material does not initially have dipoles or other electrically-charged particles therein, the electrical treatment is applied until such are created. Preferably, the electrical treatment of the material is permitted to continue until at least some of the dipoles and/or other charges which are oriented and/or created thereby are at right angles to the material's surface wall.

As can be seen above, the present invention is not limited only to the electrical treatment of materials which have pendant groups or other obvious dipoles attached to their macromolecules. To the contrary, even if a material lacks the presence of such pendant groups or obvious dipoles, it can still be electrically treated in accordance with the present invention.

In this instance, the desired degree of polarization and/or creation of dipoles or other charges can be achieved by increasing the intensity of the non time-varying, electrical field. Specifically, it has been observed that subjecting such a material to higher voltage levels will displace at least some of the electrons and/or other charges within the material. This displacement creates local dipoles, including ionic dipoles or radical groups with free electrons; thus, inducing the desired electrical effect.

In addition to the material's polarization susceptibility, and/or its susceptibility to the creation of dipoles or other electrically-charged particles therein, another factor which is considered when determining the intensity of the non time-varying, electrical field is the material's thickness. It has been discovered that the desired electrical effect can be achieved by subjecting the temperature-adjusted material to a non-variable voltage in the range from between about 100 volts to about 10 Mega volts, for each centimeter of thickness of the material being electrically treated. Preferably, the voltage applied during the electrical treatment step ranges from between about 500 volts to about 5 Mega volts per centimeter of thickness; more preferably, from between about 1000 volts to about 1 Mega volt per centimeter of thickness. The non time-varying, polarizing electrical field is preferably applied across the thickness of the extruded, injected or pressed material (i.e., in a perpendicular direction).

The length of time that such an electrical field should be applied depends, in part, on the following parameters:

(a) the thickness of the material being electrically treated, (b) the desired electrical effect, (c) the material's polarization susceptibility and/or its susceptibility to the creation of dipoles or other electrically-charged particles therein while the material is at a polarization temperature ($T_p$), and (d) the voltage level being used.

Generally, after taking the above into consideration, the electrical field should be at an intensity level such that the desired electrical effect is induced when the temperature-adjusted material is subjected to the electrical field for a time period ranging from between about 1 second to about 10 minutes. Preferably, the intensity of the electrical field should be such that the desired electrical effect is induced when the material is subjected thereto for a time period ranging from between about 5 seconds to about 5 minutes; more preferably, for a time period ranging from between about 10 seconds to about 2 minutes.

As stated earlier, the temperature-adjusted material is electrically treated while the material is at a temperature of polarization ($T_p$). Moreover, as also stated earlier, for an amorphous type material, a $T_p$ is one wherein the temperature is at least about one half of the material's glass transition temperature ($T_g$), when $T_g$ is given in degrees Kelvin; and, for a crystalline or semi-crystalline type material, a $T_p$ is one wherein the temperature is at least about one half of that material's melting temperature ($T_m$), when $T_m$ is given in degrees Kelvin.

Generally, an amorphous type material is subjected to the non time-varying electrical field while the material is at a temperature in the range from between about 0.5 $T_g$ to about 1.35 $T_g$ for that material. Preferably, the electrical field is applied while the material is at a temperature in the range from between about 0.75 $T_g$ to about 1.25 $T_g$ for that material.

On the other hand, a crystalline or semi-crystalline type materials is subjected to the non time-varying electrical field while the material is at a temperature in the range from between about 0.5 $T_m$ and that material's melting temperature ($T_m$). Preferably, the electrical field is applied while the material is at a temperature in the range from between about 0.6 $T_m$ to about 0.9 $T_m$ for that material.

After the temperature-adjusted material is electrically treated to induce therein the desired electrical effect, the induced electrical effect is permitted to at least partially relax. As used herein, the term "relaxation" refers to the disorientation of and/or decrease in at least some of the dipoles of or other charges within the electrically-treated material. This disorientation generates a detectable electrical current.

After or while the electrically-treated material has been, or is being, relaxed, the current generated thereby is measured. This measurement is taken before the electrically-treated material is cooled to a temperature wherein the induced electrical effect is frozen therein. Generally, this measurement is taken while the at least partially relaxed, electrically-treated material is at a temperature which is greater than about 20% below that material's melting temperature ($T_m$) expressed in degrees Kelvin. Preferably, the measurement is taken while the relaxed, or relaxing, material is at a temperature which is greater than about 15% below its melting temperature ($T_m$); and more preferably, while the material is at a temperature which is greater than about 10% below its melting temperature ($T_m$).

Once the current has been measured, a relationship is established between it and certain internal, physical morphological characteristics of the material at that particular processing point. By establishing such a relationship, one is now able to analyze, monitor and/or control certain aspects of the material's internal morphological structure. The manner in which this correlated relationship can be used in accordance with the present invention will be apparent to those skilled in the art upon reading this disclosure. For example, the measured current can be used to either directly or indirectly control certain aspects of the material's pre-molding, molding and/or post molding operations.

As stated above, the current generated by the at least partial relaxation of the induced electrical effect must be measured before the induced electrical effect has been frozen therein. However, after all current measurements have been taken, the material is cooled to a temperature which is at least about 20% below the material's melting temperature ($T_m$) expressed in degrees Kelvin. Preferably, during this particular step of the invention, the material is cooled to a temperature which is at least about 25% below its melting temperature ($T_m$); and more preferably, to a temperature which is at least about 50% below its melting temperature ($T_m$).

Once the material has been cooled to a temperature wherein no further electrical effect can be induced therein, the resulting material is molded into its desired shape. Any suitable molding technique known to those skilled in the art can be used for this purpose. Examples of such suitable molding techniques include, but are not limited to: injection-molding, blow-molding, compression-molding, transfer molding, calendaring, laminating, cold molding, extruding, and the like.

It should be noted that it is within the purview of this invention to have the following steps performed simultaneously with the pressing, injecting and/or extruding step(s):

(a) the temperature-adjusting step, (b) the temperature-adjusting and the electrical-treatment steps, (c) the temperature-adjusting, the electrical-treatment and the relaxation steps, (d) the temperature-adjusting, the electrical-treatment, the relaxation and the electrical current measurement steps, or (e) the temperature-adjusting, the electrical-treatment, the relaxation, the electrical current measurement and the cooling steps.

The present invention can be practiced such that a certain degree of an induced electrical effect remains in the material, after it has been cooled to a temperature at which the induced electrical effect would be frozen therein. In this instance, the invention can additionally be used as a means of analyzing, monitoring and/or controlling the material's internal, morphological structure as the same is subjected to downstream processing conditions.

It may seem that the electrical effect induced in the material during the electrical treatment step of the present invention would be lost when the material is re-heated during subsequent molding techniques (e.g., blow-molding). It has been discovered, however, that this is not the case. Specifically, while some of the induced electrical effect may relax or decrease, enough should remain as a "stain" to characterize (i.e., "tag") the material. This phenomena is due, in part, to the long relaxation times which are necessary to erase induced electrical effects in such materials. A more detailed explanation as to how this invention can be used to "tag" a material now follows.

As stated above, when practicing the present invention, it is necessary to electrically treat the pressed, injected or extruded material before it is molded to its desired shape. This electrical treatment comprises the polarization and/or creation of the dipoles of or other charges within the material, thus creating an induced electrical effect.

This induced electrical effect can be used to "tag" the material. This "tagging effect" is also known in the industry as inducing a "thermal electret", or as producing a "thermally induced electret" in a material.

This electret effect can generally be revealed on reheating. Specifically, at the onset of the main motions inside the material, when the material is reheated, the dipoles, or other charges within the material which were polarized and/or created, disorient and/or decrease in order to recreate the equilibrium state for the material at that corresponding temperature. This disorientation and/or decrease creates a small, yet detectable, current.

In Thermally Stimulated Current (TSC) techniques employed to test the thermo-analytical properties of a specimen in the plastics industry, a plastic material is first prepared and molded by using conventional polymerization processing techniques. After the material has been prepared, samples thereof are heated in a cell to a certain temperature. Thereafter, the heated materials are subjected, while inside the cell, to the electrical field generated by a constant DC voltage in order to induce a polarization effect therein. Once induced, the polarization is "quenched in" by a rapid cooling process. The polarized material is then shorted between electrodes inside the cell and heated at a constant rate. An electrometer reads the current flowing through the material as it depolarizes due to the thermal activation.

The physical transitions of such a polarized material are easily detected using the above processes (e.g., glass transition ($T_g$) for amorphous polymers and melting temperature ($T_m$) for crystalline and semi-crystalline polymers). These concepts are used in measuring instruments designated as Thermally Stimulated Current (TSC) Spectrometers. Such instruments are commercially available to detect the physical transitions of non-conducting and semi-conducting materials.

Figure 2:
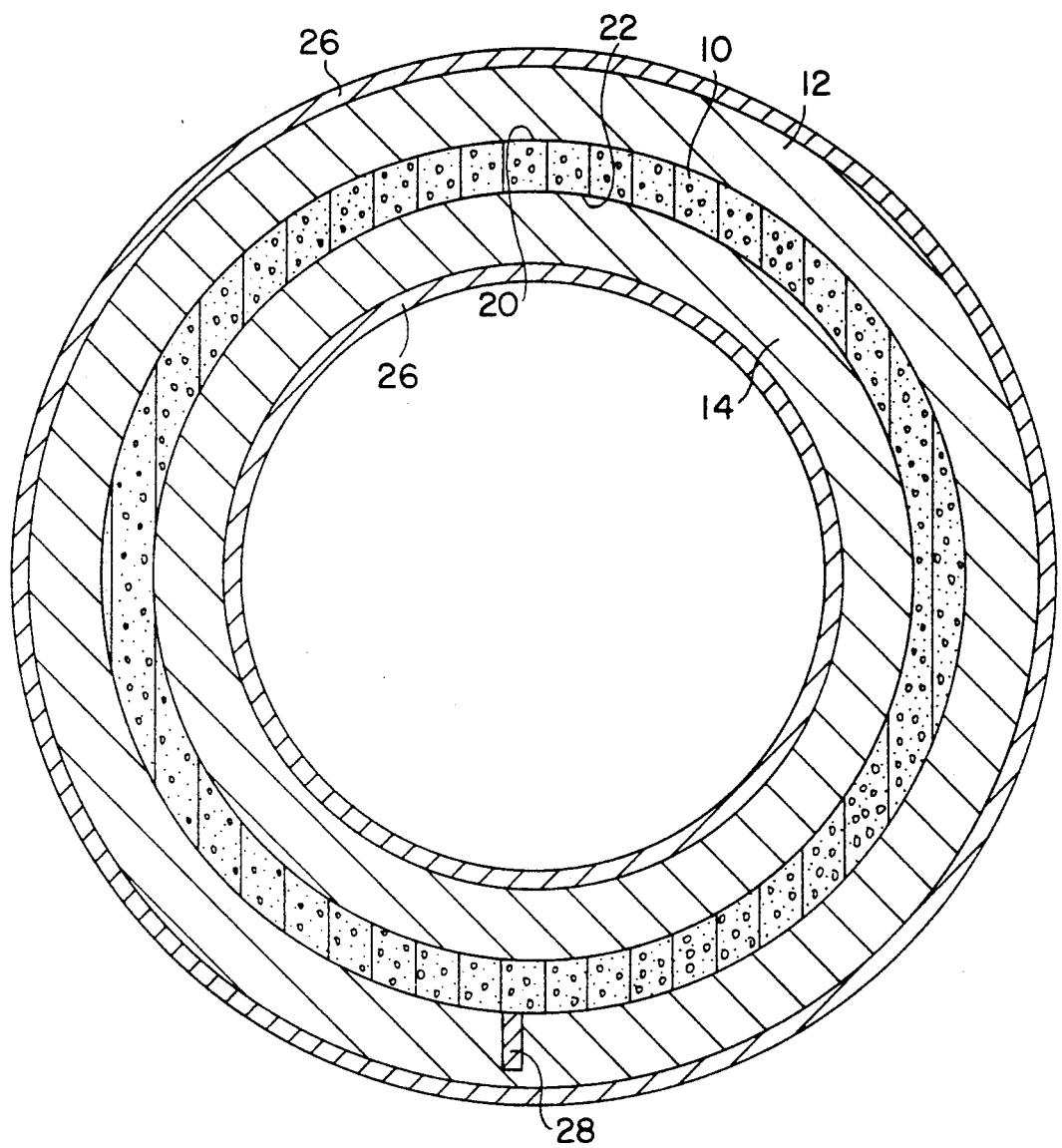
FIG. 2 is a view of FIG. 1 taken along line 2—2 showing the relationship of tagging electrodes to a moldable material being polarized thereby.

Specific means and embodiments for practicing a portion of the present invention is illustrated in FIGS. 1-4. Referring now to FIGS. 1 and 2, they collectively illustrate a flowing, non-conductive, moldable material 10. A set of stationary tagging electrode rings, 12 and 14, are located upstream of a set of stationary collecting electrode rings, 16 and 18.

Tagging electrode ring 12 is in an adjacent relationship with the outside wall surface 20 of flowing material 10. On the other hand, tagging electrode 14 is in an adjacent relationship with the inside wall surface 22 of flowing material 10. Tagging electrode 12 is in alignment with tagging electrode 14.

Tagging electrodes 12 and 14 are designed such that a voltage ($V_p$) can be passed therebetween. Any suitable means can be employed to pass a voltage between tagging electrodes 12 and 14. In FIG. 1, the voltage is generated by voltage source 24.

In order to insure that the voltage created by voltage source 24 passes through flowing material 10, tagging rings 12 and 14 are insulated by insulating material 26. As can be seen, insulating means 26 does not insulate that surface of tagging electrodes 12 or 14 which are in an adjacent relationship with the wall surfaces of flowing material 10.

Any suitable insulating material can be used. Examples of suitable insulating materials include, without limitation, polytetrafluoroethylene and glass.

Spaced downstream from tagging electrodes 12 and 14 are collecting electrodes 16 and 18. As with tagging electrode 12, collecting electrode 16 is in an adjacent relationship with the outer wall surface 20 of flowing material 10. Furthermore, collecting electrode 18 is in an adjacent relationship with the inside wall surface 22 of flowing material 10.

Collecting electrodes 16 and 18 are aligned with one another. Moreover, those surfaces of the collecting electrodes which are not adjacent to the inside or outside wall surface of flowing material 10 are insulated by insulating material 26.

In a preferred embodiment, the tagging electrodes are designed to measure the temperature of the material flowing therepast. Any suitable temperature measuring means can be employed. For illustration purposes, the temperature measuring means for the tagging electrodes in FIGS. 1 and 2 is represented by thermocouple 28 which is connected to temperature monitor 30.

In yet a further preferred embodiment, the collecting electrodes are also designed to monitor the temperature of the material flowing therepast. For illustration purposes, the temperature measuring means for the collecting electrodes in FIG. 1 is represented by thermocouple 32 which is connected to temperature monitor 34.

Collecting electrodes 16 and 18 are connected to an electrometer which is designed to measure the current generated by the depolarization and/or decrease of the dipoles of and/or other charges in flowing material 10. This depolarization and/or decrease of dipoles or other charges follows the polarization which was created by tagging electrodes 12 and 14.

Any suitable means for measuring the current generated by the relaxation of polarized dipoles or charges can be employed when practicing this invention. In the embodiment illustrated in FIG. 1, the electrometer 36 is used.

In operation, in an upstream process, material 10 is pressed, injected or extruded such that it flows past the set of tagging electrodes and collecting electrodes. However, before the material reaches the set of tagging electrodes, its temperature adjusted until it is within the range at which it can be polarized (i.e., at a polarization temperature ($T_p$))

While material 10 is at this polarization temperature, it passes between tagging electrodes 12 and 14. A voltage is then passed between tagging electrodes 12 and 14 by voltage source 24. Taking into consideration the rate at which material 10 is flowing and its polarization temperature at that point in time, the voltage generated by voltage source 24 is at a level such that: (a) the dipoles or other electrically-charged particles therein are oriented in the direction of the electrical field, or (b) dipoles or other electrically-charged particles are created within flowing material 10.

After passing by tagging electrodes 12 and 14, flowing material moves distance "d". During this time, at least some of the dipoles or other electrically-charged particles which were polarized (or created) by the tagging electrodes are disoriented (i.e., the charges in material 10 begin to "relax"). Specifically, since material 10 is still at a polarization temperature, the charges therein which were polarized (or created) begin to move towards their original equilibrium state.

The relaxation of electrically-treated material 10 creates a small, but detectable, electrical current. This current is detected by collecting electrodes 16 and 18. Electrometer 36 then measures the current associated with the relaxation of flowing material 10 at a specific temperature as it traveled distance "d".

A relationship can be created between the current measured by electrometer 36 and the internal physical state of material 10. This relationship can, in turn, be used to map the internal morphology of the material at given points in time.

By using conventional programming techniques, the current measured by electrometer 36 can be fed into computer processor 38. In addition, the temperature measured by temperature monitoring means 30 and 34 can also be fed into computer processor 38.

Computer processor 38 can be programmed by conventional means to control voltage source 24 such that the current monitored by electrometer 36 is within a specific range. This can, in turn, be used to control the internal physical structure of the material being pressed, injected or extruded.

It should be noted that, although in FIGS. 1-4 the tagging electrodes and collecting electrodes are illustrated as set of "rings", any suitable configuration can be employed. For example, if the material was in the form of a sheet (as opposed to a pipe), the tagging and collecting electrodes can be sets of plates or bars.

In the embodiment illustrated in FIG. 1, there is one set of tagging electrodes and one set of collecting electrodes. However, it is within the purview of this invention to have a plurality of tagging electrodes and/or collecting electrodes.

Figure 3:
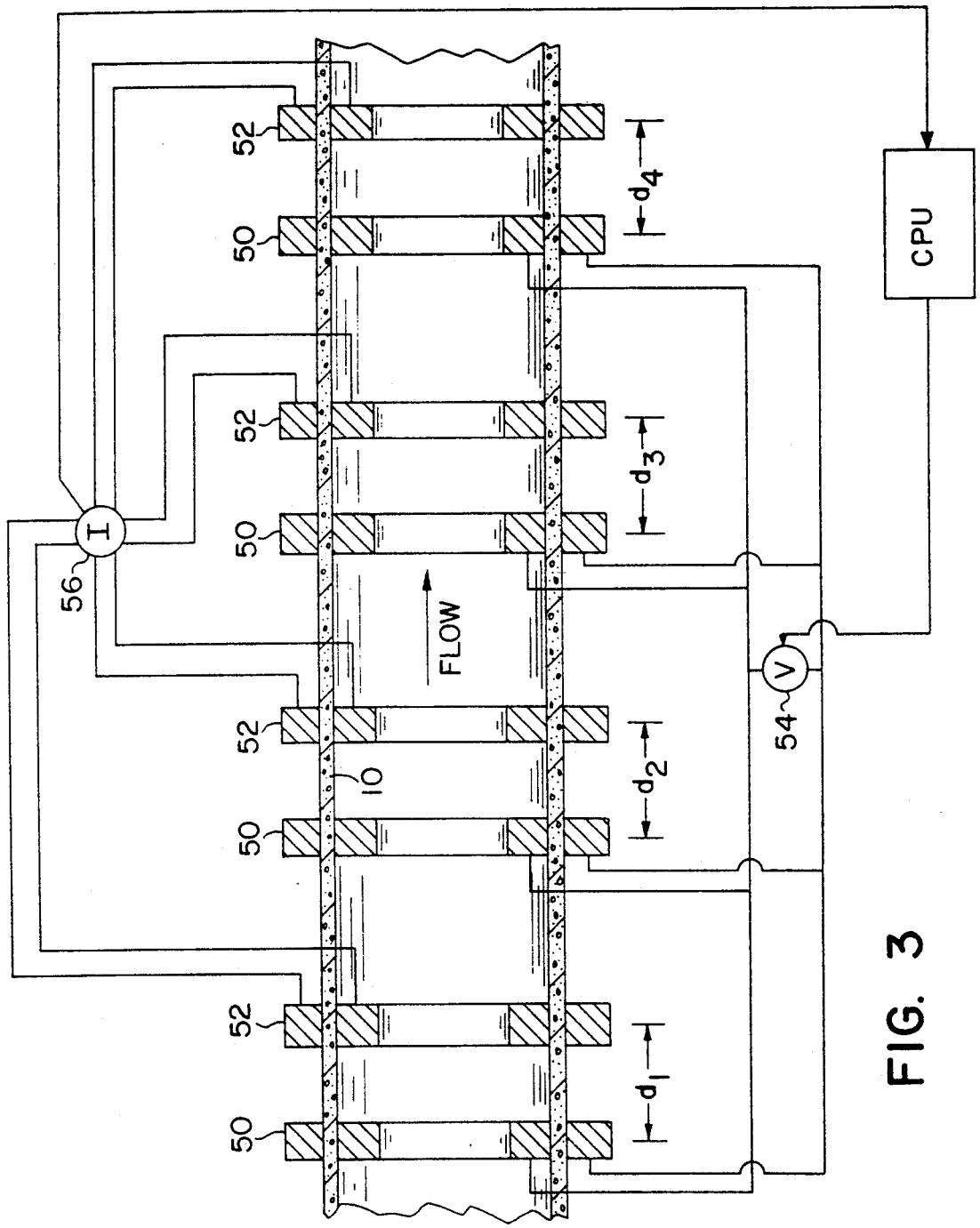
FIG. 3 is a cross-sectional view of a portion of an extrusion process consisting of a succession of electrically treating rings and electrical current monitoring rings as used in a process encompassed by the present invention.

In other words, this invention includes embodiments wherein multiple number of polarization and depolarization steps are performed (see, for example FIG. 3). This invention also includes embodiments wherein relaxation currents are measured from a single tagging step at different locations along the processing stream (see, for example FIG. 4).

In FIG. 3, four different sets of tagging electrodes 50 and collecting electrodes 52 are illustrated. This embodiment is useful when the temperature of flowing material is relatively high and the depolarization current becomes very small in a relatively short period of time; thus, making it difficult to differentiate various states of the plastic with the use of only one set of tagging electrodes and collecting electrodes.

In this Figure, several sets of tagging electrodes and collecting electrodes are positioned at various locations along the flowing stream of material 10. The current at the different collecting electrodes is normalized to the temperature at their corresponding tagging electrodes.

The distance "d" between each set of tagging and collecting electrodes is preferably kept constant. In other words, $d_1$, $d_2$, $d_3$, and $d_4$ are all equal to one another.

It is also preferred to have the same voltage applied to each of the tagging electrodes. This can be done by connecting all of the tagging electrodes to the same power supply 54.

Moreover, it is even further preferred to have all of the collecting electrodes connected, in parallel, to the same electrometer, 56. Electrometer 56 preferably is designed to have an electronic switching unit which is capable of reading the current at the collector level in sequence with only one electrometer.

The calibration of the current of depolarization is performed in a separate testing using isothermal depolarization, for instance, in a TSC instrument. The current is divided by the temperature of the corresponding set of tagging electrodes to normalize the results and allow the determination of the relaxation time and viscosity of the material, at the collecting electrodes, by comparison with the calibration curves.

As stated above, this invention also encompasses embodiments wherein several sets of collecting electrodes are associated with one specific set of tagging electrodes. Such an embodiment is illustrated in FIG. 4.

Figure 4:
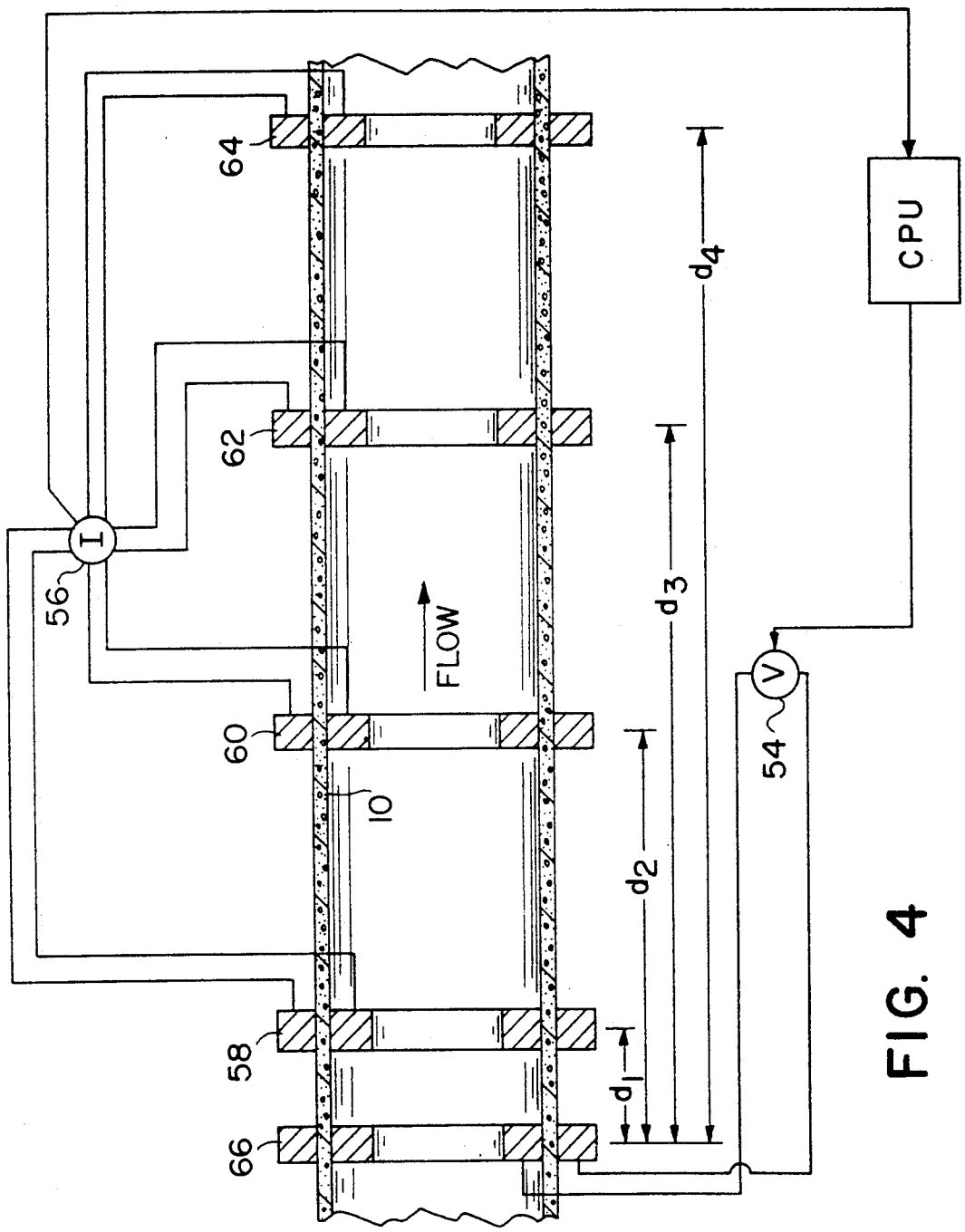
FIG. 4 is a cross-sectional view of a portion of an extrusion process consisting of a single set of tagging electrodes associated with a plurality of sets of collecting electrodes.

Referring now to FIG. 4, four different sets of collectors 58, 60, 62 and 64 are associated with tagging electrodes 66. Each set of collecting electrodes reads the current generated by depolarization as material 10 flows therepast.

The intensity of the current at a particular set of collecting electrodes depends, in part, upon the temperature of the flowing material, its viscosity and the distance "d" between the collecting electrodes and the tagging electrodes. By plotting the depolarization current generated at different locations along the flowing stream of material 10, a temperature profile for that material can be established. An example of such a temperature profile is illustrated in FIG. 5.

Regardless of which of the embodiments are used to electrically treat ("tag") the pressed, injected or extruded material and to measure ("collect") the current generated by the at least partial relaxation of the electrically-treated material, this material is subsequently cooled to a temperature below that at which no further polarization or depolarization can occur. Thereafter, the cooled material is molded to its desired shape by using any conventional molding technique known to those skilled in the art.

As demonstrated above, the present invention induces an electrical effect during an electrical treatment step which is performed before the material is molded to its desired shape. Specifically, after the material has been electrically treated in accordance with the present invention, it is then molded into its desired shape. Therefore, by practicing the present invention, a molded material can be studied with an electrometer, without the need for the preliminary "polarization" stage which is typically necessary when employing the TSC analyzer instruments disclosed above. Accordingly, by practicing the invention, the resulting material can be analyzed without destroying that which modified its $T_g$ for amorphous type materials, or its $T_m$ for crystalline or semi-crystalline type materials.

In view of the above, it has also been demonstrated how the application of a non time-varying electrical field, during the electrical treatment step of the present invention, can have the effect of a tagging probe inserted in the structure. It has also been demonstrated how the practice of the present invention can be used to characterize the charges in the material induced by posterior molding and shaping histories.

Furthermore, if the output current during the relaxation stage in an electrometer is related to certain aspects of the material's internal morphological structure, this information can be used to analyze, monitor and/or control these aspects by employing some sort of feedback loop. This feedback can be used to directly or indirectly control certain aspects of the material's permolding, molding and/or post molding operations.

The practice of the present invention can be used to create a map of the internal state for the different points of the material. This can be particularly useful to determine the effect of variables commonly addressed to in conventional molding techniques on the internal stress and stress distribution for the part.

If the material is subjected to the process of the present invention, the electrical treatment step can be used to induce "tags" which relax differently depending upon their location. The different degrees of relaxation is due to differing variables such as, for example, different influences of subsequent shear stresses, different temperature gradients, etc. Therefore, by subjecting a material to the novel process of the present invention, the initially isotropic and homogeneous distribution of local tags in the material will give, after the molding process is in effect, a very different picture which will reflect the thermal mechanical history of the material.

It has been discovered that other means could also be used to obtain the same "tagging effect" during the electrical treatment step of the present invention. Examples of such other means include, but are not limited to: ion and particle bombardment, thermo-luminescent effects, and even "vibrational noise" which could be recorded in as pre-historical event, and in as such vibrational electrical energy of some sort (at constant frequency, constant amplitude). The purpose of this would be to "tag" the structure for future release of the post-treatment information, and would not apply to the teaching pertaining to altering the micro or morphological structure of the material by subjecting the same to vibration (e.g., a "vibro-molding" process as disclosed, for example, in U.S. Letters Patent 4,469,649).

It is evident from the foregoing that various modifications can be made to the embodiments of the invention without departing from the spirit and scope thereof.

That which is claimed is:

1. A process for analyzing, monitoring or controlling the internal structure of a non-conductive, moldable material, said process comprising the steps of:

(a) pressing, injecting or extruding a non-conductive, moldable material which either has dipoles or other electrically-charged particles therein, or which is susceptible to the creation of dipoles or other electrically-charged particles therein when said material is subjected to an electrical field;

(b) adjusting the temperature of the pressed, injected or extruded material until it is at a temperature of polarization ($T_p$) which is at least about one half of the material's glass transition temperature ($T_g$) for amorphous type materials when $T_g$ is given in degrees Kelvin, or at least about one half of the material's melting temperature ($T_m$) for crystalline or semi-crystalline materials when $T_m$ is given in degrees Kelvin;

(c) electrically treating the temperature-adjusted material by subjecting the same to a non time-varying, electrical field, said material is subjected to said electrical field either until at least some of the dipoles of or other charges within said material are oriented in the direction of the electrical field, or until dipoles or other electrically-charged particles are created thereby;

(d) permitting at least particle relaxation of the electrically-treated material, wherein said relaxation results in the disorientation of or decrease in at least some of the dipoles of or other charges within said material which were oriented or created during the electrical treatment step, and wherein said disorientation of or said decrease in the dipoles or charges generates an electrical current;

(e) measuring the electrical current generated from the at least partial relaxation of the electrically-treated material;

(f) correlating a relationship between the measured electrical current and the internal physical state of the material;

(g) cooling the relaxed, electrically-treated material to a temperature which is at least about 20% below the material's melting temperature ($T_m$) expressed in degrees Kelvin; and (h) molding the cooled material to a desired shape.

2. A process as recited in claim 1 wherein said non-conductive, moldable material has dipoles or other electrically-charged particles therein.

3. A process as recited in claim 1 wherein said non-conductive, moldable material is substantially free of dipoles or other electrically-charged particles therein but is susceptible to the creation of dipoles or other electrically-charged particles when subjected to an electrical field.

4. A process as recited in claim 1 wherein, prior to said electrical treatment step, the temperature of said pressed, injected or extruded material is in the range of between about 0.5 $T_g$ to about 1.35 $T_g$ of said material when said material is amorphous, and when $T_g$ is given in degrees Kelvin, or in the range of between about 0.5 $T_m$ to below said material's melting temperature when said material is crystalline or semi-crystalline, and when $T_m$ is given in degrees Kelvin.

5. A process as recited in claim 4 wherein, prior to said electrical treatment step, the temperature of said pressed, injected or extruded material is in the range of between about 0.75 $T_g$ to about 1.25 $T_g$ of said material when said material is amorphous, and when $T_g$ is given in degrees Kelvin, or in the range of between about 0.5 $T_m$ to about 0.9 $T_m$ of said material when said material is crystalline or semi-crystalline, and when $T_m$ is given in degrees Kelvin.

6. A process as recited in claim 1 wherein the non time-varying, electrical field is a non-variable voltage ranging from between about 100 volts to about 10 Mega volts for each centimeter of thickness of said material being preconditioned.

7. A process as recited in claim 6 wherein the non time-varying, electrical field is a non-variable voltage ranging from between about 500 volts to about 5 Mega volts for each centimeter of thickness of said material being preconditioned.

8. A process as recited in claim 7 wherein the non time-varying, electrical field is a non-variable voltage ranging from between about 1000 volts to about 1 Mega volt for each centimeter of thickness of said material being preconditioned.

9. A process as recited in claim 1 wherein said non time-varying, electrical field is applied during said electrical treatment step to said temperature-adjusted material for a period of time ranging from between about 1 second to about 10 minutes.

10. A process as recited in claim 9 wherein said non time-varying, electrical field is applied during said electrical treatment step to said temperature-adjusted material for a period of time ranging from between about 5 seconds to about 5 minutes.

11. A process as recited in claim 10 wherein said non time-varying, electrical field is applied during said electrical treatment step to said temperature-adjusted material for a period of time ranging from between about 10 seconds to about 2 minutes.

12. A process as recited in claim 1 wherein, during step (g), said relaxed material is cooled to a temperature which is at least about 60° C. below said material's minimum polarization temperature ($T_p$).

13. A process as recited in claim 10 wherein, during step (g), said relaxed material is cooled to a temperature which is at least about 25% below said material's melting temperature ($T_m$) expressed in degrees Kelvin.

14. A process as recited in claim 1 wherein during step (h), said cooled material is shaped by being subjected to a process selected from the group consisting essentially of: injection-molding, blow-molding, compression-molding, transfer molding, calendaring, laminating, cold molding, and extruding.

15. A process as recited in claim 1 wherein step (b) is performed simultaneously with step (a).

16. A process as recited in claim 1 wherein steps (b) and (c) are performed simultaneously with step (a).

17. A process as recited in claim 1 wherein steps (b), (c) and (d) are performed simultaneously with step (a).

18. A process as recited in claim 1 wherein steps (b), (c), (d) and (e) are performed simultaneously with step (a).

19. A process as recited in claim 1 wherein steps (b), (c), (d), (e) and (f) are performed simultaneously with step (a).

20. A process as recited in claim 1 wherein steps (b), (c), (d), (e), (f) and (g) are performed simultaneously with step (a).

21. A process as recited in claim 1 wherein step (c) results in the dipoles of or other charges within said material being oriented at right angles to said material's surface wall.

22. A process as recited in claim 1 wherein step (e) is performed while said at least partially relaxed material is at a temperature which is greater than about 20% below said material's melting temperature ($T_m$) expressed in degrees Kelvin.

23. A process as recited in claim 22 wherein step (e) is performed while said at least partially relaxed material is at a temperature which is greater than about 15% below said material's melting temperature ($T_m$) expressed in degrees Kelvin.

24. A process as recited in claim 23 wherein step (e) is performed while said at least partially relaxed material is at a temperature which is greater than about 10% below said material's melting temperature ($T_m$) expressed in degrees Kelvin.

25. A process as recited in claim 1 wherein the current measured during step (e) is used to control a premolding, molding or post molding operation.

* * * * *